(12) United States Patent
van Stiphout (10) Patent No.: US 10,493,918 B2
(45) Date of Patent: Dec. 3, 2019

(54) FASTENING CONSTRUCTION, EXTERIOR MIRROR PART, BODY PART, EXTERIOR MIRROR UNIT, MOTOR VEHICLE, AND METHOD

(71) Applicant: MCi (Mirror Controls International) Netherlands B.V., Woerden (NL)

(72) Inventor: Paulus Gerardus Maria van Stiphout, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 207 days.

(21) Appl. No.: 15/536,981

(22) PCT Filed: Dec. 17, 2015

(86) PCT No.: PCT/NL2015/050876
§ 371 (c)(1),
(2) Date: Jun. 16, 2017

(87) PCT Pub. No.: WO2016/099270
PCT Pub. Date: Jun. 23, 2016

(65) Prior Publication Data
US 2017/0361773 A1     Dec. 21, 2017

(30) Foreign Application Priority Data
Dec. 19, 2014   (NL) ...................................... 2014026

(51) Int. Cl.
*B60R 1/072*     (2006.01)
(52) U.S. Cl.
CPC .................................. *B60R 1/072* (2013.01)

(58) Field of Classification Search
CPC B60R 1/06; B60R 1/072; B60R 1/025; B60R 1/066
(Continued)

(56) References Cited

U.S. PATENT DOCUMENTS

2002/0024751 A1\* 2/2002 Guttenberger .......... B60R 1/072
                                                    359/879
2004/0125476 A1\* 7/2004 Boddy .................... B60R 1/072
                                                    359/879

FOREIGN PATENT DOCUMENTS

CN      102892628 A    1/2013
CN      103237684 A    8/2013
(Continued)

*Primary Examiner* — William R Alexander
*Assistant Examiner* — Ephrem Z Mebrahtu
(74) *Attorney, Agent, or Firm* — Volpe and Koenig P.C.

(57) ABSTRACT

The invention relates to a fastening construction for an exterior mirror unit for a motor vehicle, comprising two parts secured to each other substantially immovably at least in an axial direction. A first part has a frame, configured to cooperate with the second part, which accommodates a resilient element such that the frame can at least locally allow the resilient element, during assembly of the first part to the second part, to bend and/or spring away in a sideward direction which extends substantially transversely to the axial direction, while the frame at least locally prevents the resilient element from bending and/or springing away at least one way in said axial direction. The fastening construction is furthermore configured to have the resilient element, during the placement of the first and the second part onto each other, spring away in the sideward direction and thereupon have it at least partly spring back. The second part is configured to retain the sprung-back resilient element at least in axial direction.

15 Claims, 3 Drawing Sheets

(58) Field of Classification Search
USPC .................................................. 359/871–884
See application file for complete search history.

(56) References Cited

FOREIGN PATENT DOCUMENTS

| | | |
|---|---|---|
| DE | 19908888 A1 | 9/2000 |
| EP | 1170174 A2 | 1/2002 |
| WO | 2011002289 A1 | 1/2011 |

\* cited by examiner

FASTENING CONSTRUCTION, EXTERIOR MIRROR PART, BODY PART, EXTERIOR MIRROR UNIT, MOTOR VEHICLE, AND METHOD

The invention relates to an exterior mirror unit for a motor vehicle.

Motor vehicles are usually provided with one or more exterior mirror units to improve the driver's view of what is happening around him. Exterior mirror units usually comprise different parts, at least some of which often are, or should be, mutually connected substantially stiffly, fixedly or immovably. Thus, a mirror carrying plate for carrying a reflective surface, which may be formed by, for example, a glass mirror or other mirror part, may be substantially stiffly connected with, for example, a mirror adjustment mechanism, for instance with a front thereof. Such mirror adjustment mechanism may then be configured to adjust the mirror carrying plate, for instance relative to a so-called carrier, preferably by pivoting it about two axes which are substantially transverse to each other. The mirror adjustment mechanism may, for instance by its rear, be secured on the carrier substantially immovably. While the carrier may, for instance, form an integral part of a mirror cap or mirror cap part, the carrier may alternatively be a separate part which is substantially immovably secured in, on or to the mirror cap or the mirror cap part. While the mirror cap is usually rotatable about a base axis, which may then, for instance, be part of a base part to be immovably secured to the motor vehicle, the mirror cap may also be substantially immovably secured on the base part or even directly on the motor vehicle, for instance on a door thereof. Further, the base part of the exterior mirror unit may be substantially immovably secured on the motor vehicle, for instance on the door.

It will be clear that, for instance to counteract unwanted vibrations in a mirror surface, it is highly desirable that such substantially immovable or stiff connections remain substantially immovable with the passage of time, even when the motor vehicle is more than five or even ten years old. Plastic snap fingers, which may for instance be integrally formed in an element or part concerned, such as a mirror carrying plate, a front or rear side of a mirror adjuster, a carrier, a mirror cap, a base part or a car door part, tend to relax with the passage of time, for instance after a few years, to the point where two elements or parts initially substantially immovably secured to each other with the aid of such snap fingers, as a result of such relaxation are no longer substantially immovably fixed to each other and unwanted vibrations can occur. While snap fingers can provide for quick and/or easy mounting or assembly, they are nonetheless not wanted because they can start to exhibit relaxation. Therefore, parts or elements of an exterior mirror unit are typically mounted to each other or to a motor vehicle part such as a door with the aid of more time consuming connecting techniques and/or mounting means more difficult to fit, such as, for example, screwed, welded and/or glued joints. Regarding welded or glued joints it is noted that such joints can have the additional drawback that they can hardly if at all be loosened, for instance for the purpose of replacing a damaged part without this immediately necessitating replacement of the parts secured thereto, which can be economically unfavorable. Further, it is noted that many other connections require extra parts, for example, screws. Moreover, current mounting methods, such as gluing and/or screwing, can lead to faults. Thus, a part may be secured improperly, for instance when screws are not tightened properly, and/or secured askew. In addition, screws or other mounting means often also require relatively much room, which may, for instance, limit the freedom of design and/or can lead to relatively large exterior mirror units.

In an aspect, the invention envisages providing an alternative fastening construction, in particular an alternative fastening construction for an exterior mirror unit for a motor vehicle. Alternatively or additionally, the invention envisages providing an alternative exterior mirror unit, an alternative exterior mirror part and/or an alternative body part for a motor vehicle. In particular, the invention envisages providing a fastening construction and/or one or more parts therefor and/or for an exterior mirror unit that can counteract at least one of the disadvantages inherent to some known constructions or exterior mirror parts. More particularly, the invention envisages, in aspects, providing a fastening construction and/or one or more parts therefor and/or for an exterior mirror unit which on the one hand can enable a connection to be established relatively fast, relatively simply and/or with a relatively small chance of faults, but which on the other hand can also ensure nonetheless that such established connection can be relatively firm, relatively vibration-free and/or relatively durable.

To this end, a fastening construction, in particular for an exterior mirror unit for a motor vehicle, is provided that comprises two parts secured to each other substantially immovably at least in an axial direction, and preferably parts secured to each other substantially immovably, wherein a first of the two parts comprises a frame which is configured to cooperate with the second part in order that the first part can be connected therewith substantially immovably at least in an axial direction during use, wherein the frame of the first part accommodates a resilient element, preferably a resilient ring, such that the frame can at least locally allow the resilient element, during assembly of the first part to the second part, to spring away and/or bend in a sideward, for example radial, direction which extends substantially transversely to the axial direction, while the frame at least locally prevents the resilient element from bending and/or springing away at least one way in the axial direction, wherein the fastening construction is configured to have the resilient element, during placement of the first and the second part onto each other, spring away and/or bend in the sideward direction and thereupon have it at least partly spring back and/or bend back, and wherein the second part is configured to retain the at least partly sprung-back and/or bent-back resilient element at least in axial direction.

Having the resilient element spring away sidewards can enable a connection to be established in a relatively simple and/or relatively faultless way. By furthermore having the frame prevent the resilient element at least locally from bending and/or springing away at least one way in the axial direction, preferably at least the way that is substantially directed in the direction of a placement direction in which the first part and the second part during mutual attachment are moved towards each other, the resilient element can be locked in axial direction, such that a relatively firm fastening can be effected which can be relatively durable in that the resilient element does not need to be elastically deformable in axial direction and so the occurrence of relaxation in axial direction in the resilient element with the passage of time can be counteracted. Thus, also, the two parts of the fastening construction of the invention can hence continue to be held relatively stiffly onto each other in axial direction with the passage of time, in principle without this requiring a bias in axial direction. This can be a major advantage over a traditional solution working with plastic snap fingers, since such a bias directed at least partly in axial direction can decrease in such a traditional solution with the passage of time, for instance as a result of relaxation in a plastic snap finger which can extend, for instance, at least partly in a direction parallel to the axial direction. In contrast to such a traditional solution, the present invention does enable a substantially non-relaxing snap connection.

It is noted that the resilient element, preferably a resilient ring, can be a retaining element, preferably a retaining ring. Preferably, in a condition where the two parts are fastened onto each other, the resilient element may be locked in the axial direction substantially unbiased, hence in a manner substantially unloaded in the axial direction.

In embodiments, the fastening construction, the first part, the frame thereof and/or the resilient element may be so configured that the resilient element substantially cannot bend and/or spring away in axial direction, at least, not in a direction directed substantially in the direction of a placement direction in which the first part and the second part are moved towards each other as they are being fastened to each other, at least, not in a condition in which the two parts are fastened on or to each other.

Most preferably, the resilient element can comprise or be made of a metal or metal alloy, preferably a steel, such as galvanized steel and/or stainless steel. Alternatively or additionally, the resilient element can comprise or be made of a different material, for instance a plastic, such as, most preferably, a substantially non-relaxing plastic, such as PEEK (Polyether ether ketone). Preferably, the first part and/or the second part, at least parts thereof that cooperate to fasten the first and second part onto each other, can be made of plastic. Accordingly, while the resilient element can most preferably be substantially made of a substantially non-relaxing material, the above-mentioned parts or portions thereof can then be simply made of a relatively somewhat more relaxing and/or relatively low-cost plastic.

In preferred embodiments, the resilient element can be an at least partly resilient ring. The ring can then be, for example, a closed ring, for example a round or O-shaped ring. Alternatively, the ring can be an interrupted ring, for example C-shaped. It is noted that the ring can also have a different shape, such as, for example, a substantially oval or polygonal shape, which may or may not be interrupted or closed.

The invention also relates to individual parts that are usable in such a fastening construction. Furthermore, the invention relates to an exterior mirror part for an exterior mirror unit for a motor vehicle, and to a body part for a motor vehicle, preferably a part of a door, in particular a front door, of the motor vehicle, on which, for example, an exterior mirror unit can be placed then. The invention furthermore relates to an exterior mirror unit for a motor vehicle, to a motor vehicle, and to a method for fastening an exterior mirror unit or exterior mirror part to a motor vehicle or for fastening two exterior mirror parts to each other.

Further advantageous embodiments of the invention are set forth in the subclaims.

The invention will be further elucidated on the basis of exemplary embodiments represented in the drawing. In the drawing:

FIG. 1b shows a schematic perspective view of an alternative embodiment of the first part of FIG. 1a;

The drawing is merely a schematic representation of preferred embodiments of the invention. In the drawing figures, like or corresponding parts are denoted with the same or corresponding reference numerals.

Figure 1A:
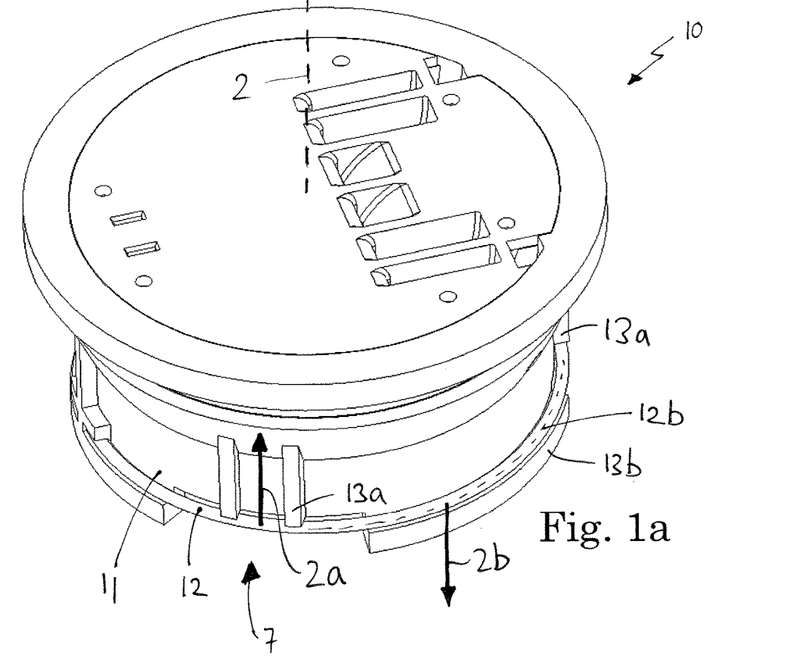
FIG. 1a shows a schematic perspective view of a first part of a fastening construction according to an aspect of the invention.
Figure 1B:
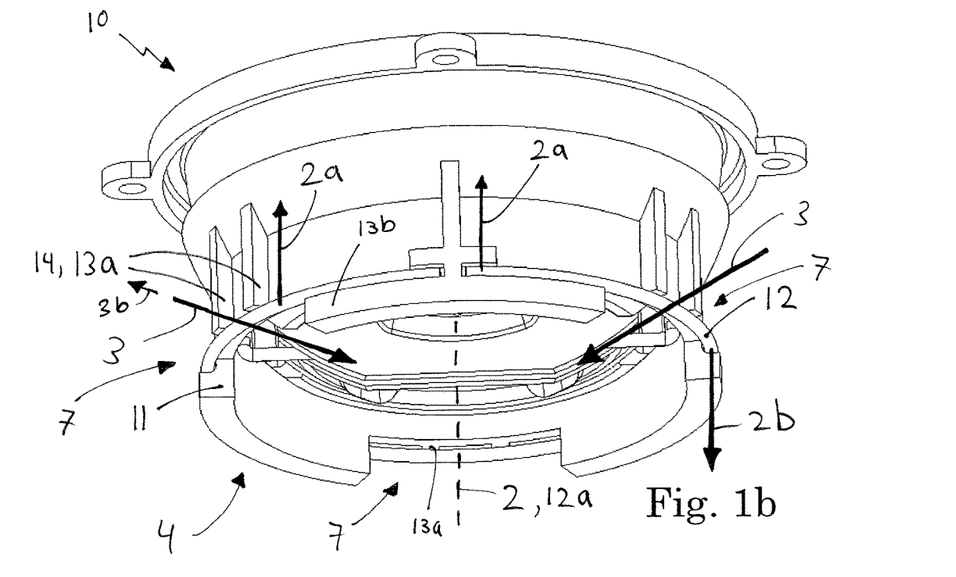
Figure 2:
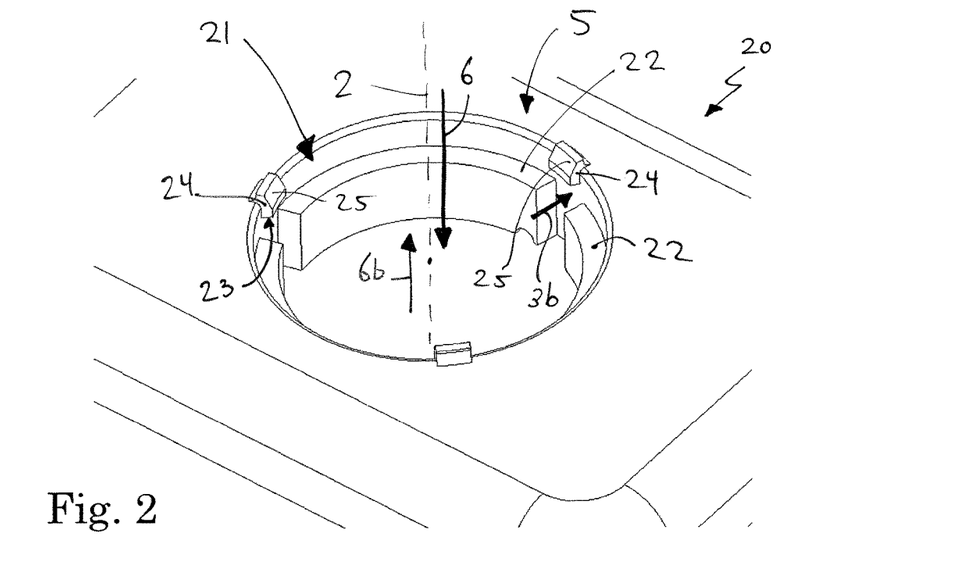
FIG. 2 shows a schematic perspective view of a second part of a fastening construction according to an aspect of the invention.
Figure 3:
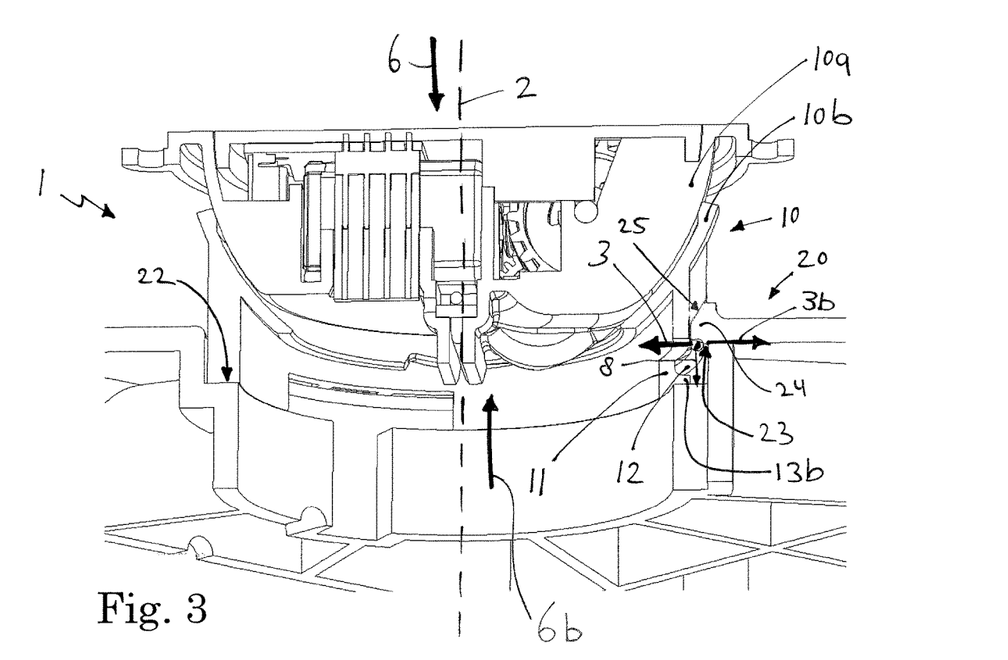
FIG. 3 shows a schematic cross section of a fastening construction according to an aspect of the invention.

The cross section of the fastening construction 1 shown in FIG. 3 comprises a first part 10 which is shown in FIG. 1b and also comprises a second part 20 which is shown in FIG. 2. In the fastening construction 1 the two parts 10, 20 are secured to each other substantially immovably at least in an axial direction 2.

The axial direction 2 can be seen as a direction that extends substantially parallel to the main direction in which the first and the second part are placed onto each other. Additionally or alternatively, the axial direction 2 can be seen as a direction that extends substantially transversely to a side 4 of the first part 10, which can preferably be regarded as the bottom or the rear side of the first part 10, which side 4 is to be assembled against, on or to a corresponding side 5 of the second part 20, which can be regarded as the top or the front side of the second part 20, and/or that extends substantially transversely to the corresponding side 5.

Most preferably, the fastening construction 1 can be a fastening construction for an exterior mirror unit for a motor vehicle.

It is noted that the first and/or the second exterior mirror part 10, 20 can be a composite part, such as a mirror adjustment mechanism, which comprises several parts. In the embodiments shown, the first part 10 is, for instance, a mirror adjustment mechanism 10, which, as can be seen, for instance, in FIG. 3, can have, for instance, a first portion 10a, on which a reflective part or a mirror carrying plate for carrying a reflective surface can be mounted, and which first portion 10a is pivotable, for instance about one or two axes, relative to a second portion 10b which, for instance, may be substantially rigidly connected with the second part 20, which can be, for example, a mirror cap or, as for instance in the exemplary embodiments of FIGS. 2 and 3, a carrier 20. While the carrier 20 can be, for instance, an integral part of a mirror cap or mirror cap part, the carrier 20 may alternatively be a separate part which, for instance, may be substantially immovably secured in, on or to the mirror cap or the mirror cap part. While the mirror cap is usually rotatable about a base axis, which can then be part of a base part to be substantially immovably secured to the motor vehicle, the mirror cap may also be substantially immovably secured on the base part or even directly on the motor vehicle, for instance on a door thereof. Further, the base part of the exterior mirror unit may be substantially immovably secured on the motor vehicle, for instance on a door thereof.

It is noted that, while in the example shown in the drawing the construction 1 comprises a first part 10 which is formed by a mirror adjustment mechanism 10, and a second part 20 which is formed by a carrier 20, the construction 1 in alternative embodiments can have a reflective part or a mirror carrying plate as first or second part which can then, for instance, be mounted on or to a mirror adjustment mechanism 10 which then functions as second part or first part, respectively. Additionally or alternatively, a connection between a carrier and a mirror cap or mirror cap part and/or a connection between a base part and a body or door part of the motor vehicle can form a fastening construction 1 according to an aspect of the invention. The respective cooperating parts of an exterior mirror unit can then be implemented as first part 10, or as second part 20, respectively.

As can be seen, for instance, in the exemplary embodiments of FIGS. 1a and 1b, the first part 10 comprises a frame 11 which is configured to cooperate with the second part 20 in order that the first part 10 can be connected with the second part 20 substantially immovably at least in the axial direction 2 during use.

The frame 11 of the first part 10 accommodates a resilient element 12, which is accommodated in such a way that the frame 11 can at least locally allow the resilient element 12, during assembly of the first part 10 to the second part 20, to spring away or to bend in a sideward, for example radial, direction 3 which extends substantially transversely to the axial direction 2. The sideward direction 3 can preferably be an inward direction 3, so that, for instance in the case of a ring-shaped resilient element 12, the ring can spring inwards in substantially radially inward direction 3. However, such sideward direction 3 can also be a different direction, for example an outward, preferably an outward substantially radial, direction. Furthermore, the frame 11 is further so configured that it prevents the resilient element 12 at least locally from bending and/or springing away at least one way 2b in the axial direction 2, and preferably also locally prevents the resilient element 12 from bending and/or springing away the other, opposite way 2a in the axial direction 2. It is noted here that the axial direction 2 can be a direction which is substantially transverse to the sideward or radial direction 3.

For instance to that end, the frame 11 may be provided with supporting means 13a, 13b which support the resilient element 12 at the top and bottom, respectively, and prevent it from bending and/or springing away and/or which prevent the resilient element 12 from shifting in axial direction 2 relative to the frame 11 of the first part. Preferably, supporting means 13a for locally preventing the resilient element 12 from bending and/or springing away in upward or forward direction 2a may at least be provided on or near a place 7 or places 7 where the resilient element 12 during assembly is pushed away in sideward direction.

In the case of a ring-shaped resilient element 12 the supporting means 13a, 13b can at least locally prevent the ring 12 from bending and/or springing away, at any rate at least one way 2a, 2b in a direction running substantially parallel to the central axis 12a of the ring 12. In the case of a ring 12 the construction 1 can prevent bending through and/or the local springing away of the ring 12 in at least one direction 2a, 2b which extends substantially transversely to the plane in which the circumferential axis 12b of the body of the ring 12 extends.

It is noted that the fastening construction 1 is configured to have the resilient element 12, during the placement of the first and the second part 10, 20 onto each other, which most preferably can be done at least partly by snapping the parts 10, 20 onto each other substantially in the axial direction 2, 2a, spring away and/or bend in the sideward direction 3 and thereupon have it at least partly spring back and/or bend back. To this end, not only the first part 10, in particular the frame 11 thereof, may be configured to allow at least locally the partial springing away, for instance springing inwards or outwards, of the resilient element 12, for instance by locally leaving clear a space at the side of the resilient element 12, but also the second part 20 may locally leave clear a space which during the placement of the first and second part 10, 20 onto each other is located at the side of the resilient element 12.

Furthermore, the second part 20 is configured to retain the at least partly sprung-back resilient element 12 at least in axial direction 2.

The resilient element 12 can preferably be an at least partly resilient ring 12. The ring can be, for example, a closed ring, which can be, for example, round or O-shaped. The ring may alternatively be a discontinuous ring, for example, a C-shaped ring.

It is noted that while the first part 10 in the embodiments shown here comprises a single resilient element 12 to mount the first part and the second part onto each other, the first part 10 in alternative embodiments can comprise a plurality of resilient elements which can each at least partly be pushed away, sprung away and/or bent substantially in a respective sideward direction, preferably in sideward directions that are located substantially in the same plane, such as a plane that is substantially transverse to the axial direction 2.

In addition, it is noted that the resilient element 12 may for instance be made of, or comprise, a resilient material. Such resilient material can be, for example, a metal, such as steel, preferably galvanized steel and/or stainless steel, and/or can be a resilient plastic, preferably a substantially non-relaxing plastic, such as PEEK.

It is noted that the resilient element 12, after the fastening of the first and the second part 10, 20 onto each other, may be locked in the axial direction 2 substantially without bias, at least without bias in the axial direction 2. This is to say that the resilient element 12 may then be in a condition in which it is substantially not bent in the axial direction and it is substantially not biased in the axial direction 2.

In exemplary embodiments, the second part 20 can comprise a receiving part 21 which is configured to cooperate with the first part 10, for instance by receiving therein at least a portion, such as a portion of the frame 11, of the first part 10. The receiving part 21 can comprise at least one support element 22 against which the first part 10, to be connected with the second part 20, can abut during use. The support element 22 can, during use, prevent the first part 10 being moved further relative to the second part 20 substantially in the direction of a placement direction 6 in which the first part 10 and the second part 20, as they are being fastened to each other, are moved towards each other.

The second part 20, preferably on or near the receiving part 21 thereof, can furthermore comprise one or more blocking elements 24 provided with a stop surface 23, which are configured to at least partly block the resilient element 12 of the first part 10, such that the resilient element 12 is substantially prevented from moving in a direction 6b substantially opposite to the placement direction 6. It is noted that the placement direction 6 most preferably extends in substantially the axial direction 2 of the fastening construction 1.

Optionally, the second part 20, preferably on or near the receiving part 21 thereof, may be provided with one or more run-on surfaces 25 for locally causing the resilient element 12 of the first part 10 to spring away and/or bend sideways, for instance, radially during the fastening of the first and the second parts 10, 20 onto each other. The run-on surface 25, viewed in the axial direction 2 and/or in the placement direction 6, can slope down obliquely and/or be configured to cause the resilient element 12 at least locally to deform.

It is noted that at least one run-on surface 25 may for instance be provided on a blocking element 24. However, the blocking element 24 provided with a stop surface 23, and the run-on surface 25 may each also be formed by separate elements.

In embodiments, the stop surface 23, viewed in the axial direction 2, may slope down in a direction towards the support element 22. Preferably, this can be done such that when during the life span an axial distance 8 between stop surface 23 and support element 22 increases to a very minor extent under the influence of relaxation with the passage of time, and the resilient element 12 is biased in a sideward, preferably radial, direction 3b, the resilient element 12 springs back a bit further in this sideward direction 3b and thereby can compensate for the increase mentioned. This is because the resilient element 12 can then abut at a slightly lower point against the stop surface 23 that has shifted up slightly through relaxation. What is thus facilitated in case of any relaxation in the material of the second part 20, as a result of which, for instance, the blocking element 24 and the support element 22, viewed in the placement direction 6 and/or axial direction 2, move apart to some extent, and/or in case of any relaxation in the material of the first part 10, is that the second part 20 can nonetheless remain fixed on the first part 10 substantially immovably at least in axial direction 2.

While the first and the second part 10, 20 of the fastening construction 1 are parts secured to each other substantially immovably in the axial direction 2, whereby these parts are prevented from shifting relative to each other in axial direction, these parts 10, 20 may additionally be prevented from shifting relative to each other in a sideward direction, which is substantially transverse to the axial direction 2, and/or be prevented from rotating relative to each other. To this end, the first and the second part may be configured such that in the assembled condition the first part is prevented from being rotated relative to the second part, in particular about a virtual axis 2 which runs substantially parallel to the placement direction 6, and/or being shifted, in particular substantially in a plane in which the sideward, preferably radial, direction 3 extends and/or a plane which is transverse to the axial direction 2. Most preferably, the first part 10 and/or the frame 11 thereof may be connected with the second part 20 substantially rigidly, stiffly or immovably.

In order to counteract or even obviate sideward displacement of the first part 10 relative to the second part 20, a part of the first part 10, for example the frame 11 thereof, may be placed at least partly in a receiving part 21 of the second part 20. Alternatively or additionally, a part of the first part 10, for example a frame 11 thereof, may be placed at least partly around a receiving part of the second part. For instance in the latter case, it may be advantageous, for instance, that the resilient element 12 is sprung away at least locally in an outward direction during mounting of the first part 10 on, around or to the second part 20.

Additionally or alternatively, the respective first or second part 10, 20 may be partly locked in the other part 20, 10 using a form closure, such that the respective part substantially cannot rotate relative to the other part 20, 10. In the embodiments shown in FIGS. 1b-3, to that end, the blocking element 24, in the assembled condition, is held between rotation limiters 14 which can each counteract or prevent the first part 10 turning a particular way relative to the second part 20, in particular substantially about the axial direction 2. For instance, the rotation limiters 14 may be formed as ribs that extend, for instance, substantially in the axial direction 2 and/or are formed by the supporting means 13a which locally prevent the resilient element 12 bending and/or spring away upwards 2a. It is noted that one or more elements of the first and/or of the second part that may be intended and/or suitable for the form closure could also serve for guidance during the snapping of the first and the second parts 10, 20 onto each other.

During the mutual attachment of the first and the second part, the first part 10 and a second part 20 may be moved towards each other substantially in a placement direction 6 or securing direction 6. At least a portion of a resilient element 12, such as a resilient ring 12, retained in a frame 11 of the first part 10 may thereby, with the aid of a run-on surface 25 of the second part 20, be locally at least partly pushed away sideward 3 in order to allow the resilient element 12 to pass locally along a blocking element 24 of the second part 20. Thereupon, the resilient element 12 can be allowed to at least partly spring back and/or bend back, such that the resilient element 12, also named retaining element 12, thereupon engages under the blocking element 24 so as to prevent the first part 10 being possibly detached from the second part 20 in a direction 6b substantially opposite to the placement direction 6.

It is noted that during placement the first part 10 may also be partly tilted relative to the axial direction 2. Thus, a portion of the resilient element 12 may for instance be slipped in an oblique direction under a first blocking element 24 without locally pushing in or pushing away the resilient element 12. Thereupon, the first part 10 can be snap-fitted by pushing the resilient element 12 and/or by pushing other resilient elements with the aid of one or more run-on surfaces 25 aside locally, so that the resilient element 12 and/or the other resilient elements can end up under one or more respective further blocking elements 24 so as to be locked with the aid thereof. While in such a manner the first part 10 is tilted slightly during assembly, it is noted that the first part 10 in this way too is fastened on the second part 20 in a placement direction 6 which is regarded as extending substantially in an axial direction 2.

Figure 4:
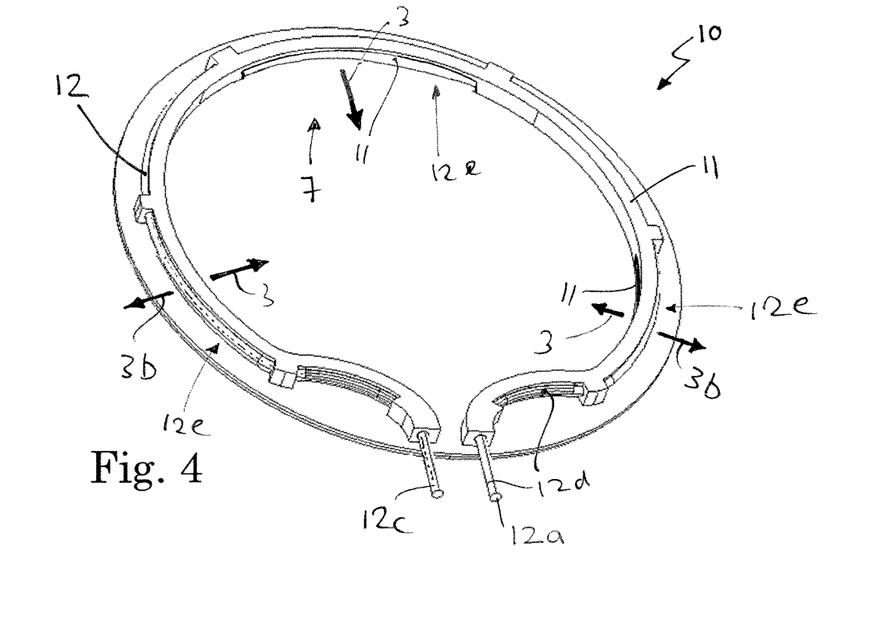
FIG. 4 shows a schematic perspective view of an alternative embodiment of a first part of a fastening construction according to an aspect of the invention.

In embodiments, the fastening construction 1 may be configured to facilitate demounting of the first part 10 from the second part 20 relatively simply, easily and/or with relatively little damage. In FIG. 4 an alternative embodiment of the first part 10 of the fastening construction is shown which is configured to allow the resilient element 12 to be removed relatively simply when the first part 10, which can be, for example, a mirror carrying plate for carrying a reflective surface or a reflective part such as a mirror plate 10, is mounted on a second part 20.

To that end, the resilient element 12 may be configured as an elongate non-closed or so-called open ring-shaped body, which ring-shaped body can have, for example, a substantially circular cross section 12a. The ring shape can be, or approximate, for example, a C-shape, a U-shape or an Ω-shape. By pulling a first or a second end 12c of the elongate body of the resilient element 12, the resilient element 12 can be pulled, substantially in the direction in which the element 12 extends during use, out of the frame 11 when the resilient element 12 is sufficiently deformable. To counteract the other end 12d possibly being relatively much of a hindrance to the pulling-out of the ring-shaped resilient element 12, this other end 12d may be relatively flexible and/or hardly, if at all, resilient with respect to the main part of the ring 12 which can comprise one or more resilient zones 12e which in turn can be less flexible, stiffer and/or more resilient.

Figure 5:
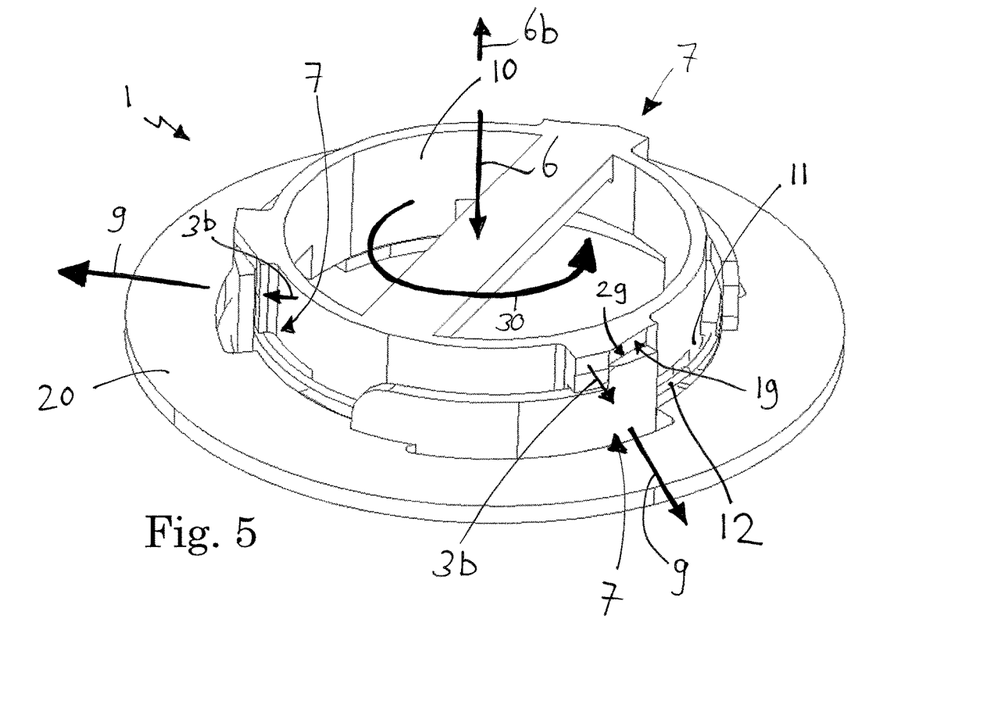
FIG. 5 shows a schematic perspective view of an alternative fastening construction according to an aspect of the invention.

FIG. 5 shows a further alternative fastening construction 1 which is configured to facilitate demounting. Like the exemplary embodiment shown in FIGS. 1a-3, the fastening construction 1 shown in FIG. 5 has a first part 10 which has a frame 11 which has a resilient element 12 which, at least locally, for instance in three places 7, can spring inwards with the aid of run-on surfaces 25 (not visible in FIG. 5) which are provided on a second part 20. After the first part 10 has been pressed far enough in the placement direction 6 towards the second part 20, the at least locally inwardly sprung resilient element 12 can at least partly spring back outwards so as to end up at least partly under a stop surface 23 (not visible in FIG. 5) of a blocking element 24 (not visible in FIG. 5) which can then prevent the first part 10 being detached from the second part 20 in a direction 6b opposite to the placement direction 6.

To still enable a relatively simple disassembly whereby the risk that one or more parts inadvertently get damaged can be kept relatively low, the fastening construction 1 and/or the second part 20 may be configured such that it can at least temporarily allow at least one and preferably more of all the blocking elements 24 to move away from the position in which the respective blocking element 24 at least partly blocks the resilient element 12. For instance, a blocking element 24 can move at least partly in a sideward or substantially radial direction 3c of the resilient element 12, preferably in a direction 9 directed substantially equally to the direction 3b in which the resilient element 12 at least partly sprang back after having initially sprung away during the fastening of the first and the second part 10, 20 to each other.

Optionally, the fastening construction 1 or the first part 10 may be configured to cause the blocking element 24 to move away, preferably to push it away, from the position in which it at least partly blocks the resilient element 12. To this end, a fastening construction 1, which may be configured to counteract to a certain extent a rotation substantially around a central axis of the construction 1, for instance with the aid of rotation limiters 14 such as ribs 13a which engage a blocking element 24, may be so configured that when the force or the moment which can prevent the rotation 30 is overcome, the first part 10 rotating relative to the second part 20 pushes away the blocking element 24 provided on the second part 20. To this end, the blocking element 24 may for instance be provided on a swiveling arm 26 which upon sufficient loading can swivel clear to some extent in its swiveling direction 9. To this end, the first part 10 may be provided with one or more run-on surfaces 29 which can cooperate with one or more run-on surfaces 19 of the first part, which last surfaces 19 may preferably be provided on a respective swiveling arm 26. Preferably, the swiveling arm 26, in a position of use in which the first and the second part have been fastened onto each other, is hardly, if at all, biased in a direction that is substantially equal to the axial direction 2 and/or in a fastening direction 6 or a direction 6b opposite thereto.

As noted, the first or second part 10, 20 may preferably be an exterior mirror part for an exterior mirror unit, in particular for a motor vehicle and/or the first or second part may be a body part for a motor vehicle, preferably a part of a door, in particular a front door, of the motor vehicle.

The invention furthermore relates to an exterior mirror unit for a motor vehicle, comprising at least one fastening construction, exterior mirror part, or body part according to one or more aspects of the invention described herein.

In addition, the invention relates to a motor vehicle provided with at least one fastening construction, exterior mirror part, body part or exterior mirror unit according to one or more aspects of the invention described herein.

It is noted that for the purposes of clarity and a concise description, elements or features have been described herein as part of the same or different exemplary embodiments, and that the scope of the invention can encompass embodiments comprising combinations of all or some of the elements or features described.

It will be clear that each of the exterior mirror units and fastening constructions shown and described and each element of the fastening construction parts and/or exterior mirror parts shown and described is also understood to have been described and shown separately and can also be applied individually and/or can be applied in combination with at least one other element and is understood to have been described herein as such.

Furthermore, it is noted that the invention is not limited to the exemplary embodiments described here. Many variants are possible.

Thus, it will be clear to those skilled in the art, for instance, that the resilient element which in the exemplary embodiments shown in the drawing can be bent or sprung away locally in three places, may in alternative embodiments be bent or sprung away in a different number of places, for example, in one, two, four, five or six places. Preferably, these places may be positioned in a manner substantially uniformly distributed in circumferential direction.

Further, it is noted that, while in the examples that have been shown the first part, which is provided with the frame accommodating the resilient element, is formed by a mirror adjustment mechanism and the second part is formed by a carrier, it may be, in alternative embodiments, that a carrier can form the first part, provided with the frame, of the construction, in which case a mirror adjustment mechanism, or a part thereof, can form the second part of the construction.

As already noted hereinabove, the construction, in alternative embodiments, can also comprise a reflective part or a mirror carrying plate as a first or as a second part, which respective part can then for instance be mounted on or to a mirror adjustment mechanism which can then function as second, or as first part, respectively. Additionally or alternatively, a connection between a carrier and a mirror cap or mirror cap part and/or a connection between a base part and a body part or a door part of the motor vehicle, can form a fastening construction according to an aspect of the present invention. The respective cooperating parts of an exterior mirror unit can then be implemented as first part, or as second part, respectively.

These and other variants will be clear to one skilled in the art and are understood to be within the scope of the invention as set forth in the appended claims

The invention claimed is:
1. A fastening construction, for an exterior mirror unit for a motor vehicle, comprising:
   a first part; and
   a second part secured to the first part substantially immovably at least in an axial direction, wherein
   the first part comprises a frame configured to cooperate with the second part such that the first part can be connected therewith substantially immovably at least in an axial direction during use, and
   the frame of the first part accommodates a resilient element such that;
      the frame, at least locally, allows the resilient element during assembly of the first part to the second part, to bend and/or spring away in a sideward direction which extends substantially transversely to the axial direction, and the frame, at least locally, prevents the resilient element from bending and/or springing away at least one way in the axial direction, wherein the fastening construction is configured to have the resilient element, during placement of the first and the second part onto each other, spring away and/or bend in the sideward direction and thereupon have the resilient element at least partly spring back and/or bend back, and wherein the second part is configured to retain the at least partly sprung-back and/or bent-back resilient element at least in the axial direction.

2. The fastening construction according to claim 1, wherein the resilient element is locked in the axial direction substantially without bias.

3. The fastening construction according to claim 1, wherein the resilient element comprises: steel, galvanized steel, stainless steel, or combinations thereof.

4. The fastening construction according to claim 1, wherein the frame at least locally prevents the resilient element from bending and/or springing away in the one way in the axial direction, and in an opposite way in the axial direction.

5. The fastening construction according to claim 1, wherein the second part comprises:

a receiving part configured to cooperate with the first part, wherein the receiving part includes at least one support element against which the first part abuts during use and which prevents the first part from being moved further in substantially a direction of a placement direction in which the first part and the second part are moved towards each other during fastening; and one or more blocking elements on or near the receiving part, each blocking element provided with a stop surface configured to at least partly block the resilient element of the first part, such that the resilient element is substantially prevented from moving in a direction substantially opposite to the placement direction.

6. The fastening construction according to claim 5, wherein the second part, on or near the receiving part thereof, is provided with one or more run-on surfaces for causing the resilient element to spring away locally sidewards during fastening of the first part and the second part.

7. The fastening construction according to claim 6, wherein at least one of the one or more blocking elements comprises at least one of the run-on surfaces.

8. The fastening construction according to claim 5, wherein the stop surface, viewed in the axial direction, slopes down in a direction towards the support element such that when the first part and the second part are fastened, an axial distance between the stop surface and the support element increases to a minor extent under influence of relaxation with a passage of time, and the resilient element which is biased in the sideward direction, springs back somewhat further in the sideward direction and thereby can compensate for the increase in the axial distance, in that the resilient element can then abut at a lower point against the stop surface which moved up slightly due to relaxation.

9. The fastening construction according to claim 5, wherein, in order to facilitate disassembly, at least one of the fastening construction or the second part is configured to at least temporarily allow at least one of the blocking elements to move away from a position in which the blocking element at least partly blocks the resilient element from moving in the sideward direction substantially equally to the direction in which the resilient element at least partly sprang back and/or bent back after the resilient element had initially sprung away and/or bent away during fastening of the first part and the second part to each other.

10. The fastening construction according to claim 9, wherein at least one of the fastening construction or the first part is configured to cause at least one of the blocking elements to move away from the position in which the blocking element at least partly blocks the resilient element from moving at least partly in the sideward direction, which is directed substantially equally to the direction in which the resilient element at least partly sprang back after the resilient element had initially sprung away and/or bent away during fastening of the first and the second part to each other.

11. The fastening construction according to claim 1, wherein the first part and the second part in the assembled condition are configured to prevent the first part from being rotated relative to the second part in particular about a virtual axis substantially parallel to at least one of the placement direction and/or axial direction, and/or from being shifted relative to the second part in particular in at least one of a plane in which the sideward direction extends or which is transverse to the axial direction.

12. A first exterior mirror part for an exterior mirror unit of a motor vehicle, wherein the first exterior mirror part is suitable for use as the first part in the fastening construction according to claim 1, wherein the first exterior mirror part is configured to cooperate with a second exterior mirror part or with the motor vehicle in order to be able to be connected therewith substantially immovably at least in the axial direction during use, wherein the first exterior mirror part comprises the frame which accommodates the resilient element such that:

the frame at least locally allows the resilient element to bend and/or spring away in a sideward direction which extends substantially transversely to the axial direction, and the frame at least locally prevents the resilient element from bending and/or springing away at least one way in the axial direction.

13. A body part for an exterior mirror unit of a motor vehicle, wherein the body part is suitable for use as the first part in the fastening construction according claim 1, wherein the body part is configured to cooperate with an exterior mirror part of the exterior mirror unit in order that the exterior mirror part can be connected with the body part substantially immovably at least in the axial direction during use, wherein the body part comprises the frame which accommodates the resilient element such that:

the frame at least locally allows the resilient element during assembly of the body part and the exterior mirror part to bend and/or spring away in a sideward direction which extends substantially transversely to the axial direction, and the frame at least locally prevents the resilient element from bending and/or springing away at least one way in the axial direction.

14. An exterior mirror part for an exterior mirror unit of a motor vehicle, wherein the exterior mirror part is suitable for use as the second part in the fastening construction according to claim 1, wherein the exterior mirror part comprises a receiving part which is configured to cooperate with another part to be substantially immovably connected therewith, wherein the receiving part comprises at least one support element against which the another part to be connected with the exterior mirror part abuts during use and which prevents the another part from being moved further in substantially a direction of a placement direction in which the exterior mirror part and the another part are moved towards each other during fastening, and wherein the receiving part furthermore comprises one or more blocking elements provided with a stop surface and configured to, during use, at least partly block a resilient element accommodated in a frame of the another part, such that the resilient element is substantially prevented from moving in the direction opposite to the placement direction.

15. A method for fastening an exterior mirror unit or exterior mirror part to a motor vehicle or for fastening two exterior mirror parts to each other comprising:
- moving towards each other substantially in a placement direction, a first part and a second part wherein the first part includes a resilient element retained in a frame of the first part and the second part includes a blocking element comprising a run-on surface;
- contacting the first part with the second part; and
- fastening the first part to the second part, wherein fastening includes at least:
- pushing away the resilient element in a substantially sidewards direction with the aid of a run-on surface, passing along of the blocking element by the resilient element and at least partially springing back and/or bending back by the resilient element such that the resilient element engages under the blocking element in order to prevent the first part from being detached from said second part in a direction substantially opposite to the placement direction, wherein in the case of fastening the two exterior mirror parts, the first part is a first exterior part and the second part is a second exterior part, wherein in the case of fastening the exterior mirror unit or the exterior mirror part to the motor vehicle, the first part is the exterior mirror part or the exterior mirror unit, and the second part is a body part of the motor vehicle, or wherein in the case of fastening the exterior mirror unit or the exterior mirror part to the motor vehicle, the first part is the body part of the motor vehicle and the second part is the exterior mirror part or the exterior mirror unit.

* * * * *